(12) United States Patent
Zhao et al.

(10) Patent No.: US 9,998,223 B2
(45) Date of Patent: Jun. 12, 2018

(54) CALCULATING APPARATUS AND METHOD FOR NONLINEAR WEIGHTING COEFFICIENT

(71) Applicant: FUJITSU LIMITED, Kawasaki-shi, Kanagawa (JP)

(72) Inventors: Ying Zhao, Beijing (CN); Liang Dou, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 11 days.

(21) Appl. No.: 14/879,374

(22) Filed: Oct. 9, 2015

(65) Prior Publication Data

US 2016/0036528 A1 Feb. 4, 2016

Related U.S. Application Data

(63) Continuation of application No. PCT/CN2014/075024, filed on Apr. 10, 2014.

(30) Foreign Application Priority Data

Apr. 10, 2013 (CN) .......................... 2013 1 0122443

(51) Int. Cl.
*H04B 10/12* (2006.01)
*H04B 10/00* (2013.01)
(Continued)

(52) U.S. Cl.
CPC ......... *H04B 10/2543* (2013.01); *H04B 10/58* (2013.01); *H04B 10/61* (2013.01);
(Continued)

(58) Field of Classification Search
CPC  H04B 10/2543; H04B 10/58; H04B 10/6163; H04B 10/25137; H04B 10/5561;
(Continued)

(56) References Cited

U.S. PATENT DOCUMENTS 6,441,950 B1 * 8/2002 Chen .................. H04B 10/0777
359/334
6,621,626 B1 * 9/2003 Meli .................... H04B 10/294
359/337

(Continued)

FOREIGN PATENT DOCUMENTS

CN 102332956 1/2012
CN 102420660 4/2012

(Continued)

OTHER PUBLICATIONS

PCT Written Opinion of the International Searching Authority dated Oct. 13, 2015 in corresponding International Patent Application No. PCT/CN2014/075024.

(Continued)

*Primary Examiner* — Ken N Vanderpuye
*Assistant Examiner* — Abbas H Alagheband
(74) *Attorney, Agent, or Firm* — Staas & Halsey LLP

(57) ABSTRACT

Embodiments of the present disclosure provide a calculating apparatus and method for nonlinear weighting coefficient. The calculating apparatus for nonlinear weighting coefficient includes: an approximation processing unit configured to use a rational function to perform approximation processing on a link loss/gain function in intra-channel nonlinear distortion estimation; and a coefficient calculating unit configured to calculate a nonlinear weighting coefficient in the nonlinear distortion estimation by using the approximated link loss/gain function and a large dispersion approximation, to obtain an analytical closed solution of the nonlinear weighting coefficient. With the embodiments of the present disclosure, a weighting coefficient of high precision may be obtained, thereby performing high-precision estimation on nonlinear distortion in case of loss.

5 Claims, 8 Drawing Sheets

(51) Int. Cl.
*H04B 17/00* (2015.01)
*H04J 14/02* (2006.01)
*H04B 10/2543* (2013.01)
*H04B 10/61* (2013.01)
*H04B 10/58* (2013.01)
*H04B 10/60* (2013.01)

(52) U.S. Cl.
CPC ......... *H04B 10/6163* (2013.01); *H04B 10/60* (2013.01); *H04J 14/0271* (2013.01)

(58) Field of Classification Search
CPC .. H04B 10/548; H04B 10/2557; H04B 10/00; H04B 10/61; H04B 10/60; H04B 10/0271; H04J 14/0271
USPC .......................................... 398/141, 28, 193
See application file for complete search history.

(56) References Cited

U.S. PATENT DOCUMENTS

| | | | | |
|---|---|---|---|---|
| 6,633,712 | B2* | 10/2003 | Dennis | H04B 10/25253 359/334 |
| 6,690,739 | B1* | 2/2004 | Mui | H04L 1/0054 375/265 |
| 7,558,479 | B1* | 7/2009 | Robinson | H04B 10/0795 398/13 |
| 7,869,680 | B2* | 1/2011 | Wei | H04B 10/2531 385/123 |
| 7,978,945 | B2* | 7/2011 | Wei | H04B 10/2531 385/123 |
| 8,386,216 | B1* | 2/2013 | Al-Hawari | G06F 17/5036 703/2 |
| 8,417,080 | B2* | 4/2013 | Wei | H04B 10/2531 385/123 |
| 8,437,643 | B2* | 5/2013 | Li | H04B 10/2507 398/147 |
| 8,737,490 | B1* | 5/2014 | Wilson | H04L 25/03057 375/244 |
| 8,943,112 | B2* | 1/2015 | Pagnanelli | H03M 3/468 708/5 |
| 8,948,253 | B2* | 2/2015 | Reckwerdt | H04N 21/233 375/240.02 |
| 9,160,448 | B2* | 10/2015 | Fan | H04B 10/0731 |
| 9,438,370 | B2* | 9/2016 | Swinkels | H04J 14/0227 |
| 2002/0064236 | A1* | 5/2002 | Matsuoka | H03C 3/406 375/296 |
| 2003/0081705 | A1* | 5/2003 | Miller | H04L 25/03343 375/346 |
| 2004/0208525 | A1* | 10/2004 | Seydnejad | H04B 10/0775 398/33 |
| 2006/0051039 | A1* | 3/2006 | Wei | H04B 10/2531 385/123 |
| 2006/0233552 | A1* | 10/2006 | Eder | H04B 10/25073 398/94 |
| 2007/0071441 | A1* | 3/2007 | Marom | H04B 10/0795 398/25 |
| 2008/0155373 | A1* | 6/2008 | Friedman | H04L 1/0002 714/752 |
| 2010/0239254 | A1* | 9/2010 | Li | H04B 10/2507 398/65 |
| 2011/0116800 | A1* | 5/2011 | Wei | H04B 10/2531 398/81 |
| 2011/0268401 | A1* | 11/2011 | Wei | H04B 10/2531 385/122 |
| 2012/0051742 | A1* | 3/2012 | Li | H04B 10/0795 398/38 |
| 2012/0076235 | A1* | 3/2012 | Dou | H04B 10/2939 375/296 |
| 2012/0127009 | A1* | 5/2012 | Pagnanelli | H03M 3/468 341/143 |
| 2013/0071119 | A1* | 3/2013 | Liu | H04B 10/516 398/65 |
| 2013/0188948 | A1* | 7/2013 | Dou | H04B 10/0795 398/28 |
| 2013/0216238 | A1* | 8/2013 | Dou | H04B 10/2543 398/193 |
| 2013/0230313 | A1* | 9/2013 | Yan | H04L 25/0202 398/25 |
| 2015/0010300 | A1* | 1/2015 | Fan | H04B 10/0731 398/29 |
| 2015/0091745 | A1* | 4/2015 | Pagnanelli | H03M 3/468 341/143 |
| 2015/0304035 | A1* | 10/2015 | Nijhof | H04J 14/0221 398/26 |

FOREIGN PATENT DOCUMENTS

| | | |
|---|---|---|
| CN | 103023828 | 4/2013 |
| EP | 2495890 A1 | 9/2012 |

OTHER PUBLICATIONS

Chinese Office Action dated Jan. 28, 2016 in corresponding Chinese Patent Application No. 201310122443.3.
Chinese Office Action dated Sep. 6, 2016 in corresponding Chinese Patent Application No. 201310122443.3.
A. Mecozzi et. al., "Analysis of Intrachannel Nonlinear Effects in Highly Dispersed Optical Pulse Transmission," IEEE PTL vol. 12, No. 4, pp. 392-394, 2000.
G. P. Agrawal, Nonlinear Fiber Optics, $2^{nd}$ ed. New York: Academic, 1995.
K. V. Peddanarappagari et. al., "Volterra Series Transfer Function of Single-Mode Fibers" IEEE JLT vol. 15, pp. 2232-2241, 1997.
K. V. Peddanarappagari et. al., "Volterra Series Approach for Optimizing Fiber-Optic Communications System Designs," IEEE JLT vol. 16, pp. 2046-2055, 1998.
E. Ip and J. Kahn, "Compensation of Dispersion and Nonlinear Impairments Using Digital Backpropagation," IEEE JLT vol. 26, No. 20, pp. 3416-3425, 2008.
F. Yaman et. al.,"Nonlinear Impairment Compensation for Polarization-Division Multiplexed WDM Transmission Using Digital Backward Propagation," IEEE Photonics Journal vol. 1, No. 2, pp. 144-152, 2009.
A. Vannucci et. al., "The RP Method: A New Tool for the Iterative Solution of the Nonlinear Schrodinger Equation," IEEE JLT vol. 20, No. 7, pp. 1102-1111, 2002.
S. Kumar et. al., "Analytical Modeling of a Single Channel Nonlinear Fiber Optic System Based on QPSK", Optics Express, vol. 20, No. 25, pp. 27740-27754, 2012.
E. Ciaramella et. al., "Analytical Approximation of Nonlinear Distortions," IEEE PTL vol. 17, No. 1, pp. 91-93, 2005.
A. Carena et.al., "Modeling of the Impact of Nonlinear Propagation Effects in Uncompensated Optical Coherent Transmission Links," IEEE JLT vol. 30, No. 10, pp. 1524-1539, 2012.
X. Chen et. al., "Closed-form Expressions for Nonlinear Transmission Performance of Densely Spaced Coherent Optical OFDM Systems," Optics Express, vol. 18, No. 18, pp. 19039-19054, 2010.
X. Wei, "Power-weighted Dispersion Dispersion Distribution Function for Characterizing Nonlinear Properties of Long-Haul Optical Transmission Links," Optics Letters, vol. 31, No. 17, pp. 2544-2546, 2006.
Japanese Office Action dated Apr. 18, 2017 in Japanese Patent Application No. 2016-506771.
Zhenning Tao et al., "Multiplier-Free Intrachannel Nonlinearity Compensating Algorithm Operating at Symbol Rate", Journal of Lightwave Technology, vol. 29, No. 17, Sep. 1, 2011, pp. 2570-2576.

\* cited by examiner

CALCULATING APPARATUS AND METHOD FOR NONLINEAR WEIGHTING COEFFICIENT

CROSS-REFERENCE TO RELATED APPLICATIONS

This application is a continuation application, under 35 U.S.C. § 111(a), of international application No. PCT/CN2014/075024, filed Apr. 10, 2014, which is based on and claims Convention priority to Chinese patent application No. 201310122443.3, filed Apr. 10, 2013, the entire disclosure of which is herein incorporated by reference as a part of this application.

FIELD

The present disclosure relates to a long-haul optical fiber communication system, and in particular to a calculating apparatus and method for nonlinear weighting coefficient.

BACKGROUND

The increase of demands for wideband traffics such as multimedia promotes an optical fiber communication system towards a direction of single-channel transmission of over 100 Gbit/s. When a single-channel rate reaches over 40 Gbit/s, an intra-channel nonlinear effect will obvious act on transmitted signals, thereby affecting communication quality.

A physical mechanism of the intra-channel nonlinear effect originates from a nonlinear Kerr effect of interaction of an electromagnetic wave and an optical fiber medium. In a high-speed long-haul optical fiber transmission system, as an optical pulse signal has a very short symbol period (<100 ps) and at the same time has relatively high transmission power (>0 dBm), a dispersion length $L_D$ and a nonlinear length $L_{NL}$ are far less than the transmission distance of the system, and hence the optical pulse signal is jointly affected by the intra-channel nonlinear effect and optical fiber dispersion effect, thereby resulting in production of energy exchange between neighboring pulses and obvious signal waveform distortion. In such a case, even if residual dispersion in the link is compensated at a receiving end, nonlinear distortion will still be produced in the pulse signal, and the transmission system will still be subjected to obvious nonlinear damages.

Taking a joint action of intra-channel nonlinearity and dispersion in an optical fiber into account, a time domain pulse sequence is mainly subjected to waveform distortion resulted from intra-channel crossing phase modulation (IXPM) and an intra-channel four-wave mixing (IFWM) effect. Such distortion may be qualitatively described as: timing jitter, pulse amplitude fluctuation and generation of a shadow pulse. For example, the timing jitter and pulse amplitude fluctuation originate from asymmetrical chirps resulted from the IXPM effect, and the shadow pulse originates from pulse energy exchange resulted from the IFWM effect. How to quantitatively calculate an effect of the above pulse distortion phenomenon on the long-haul optical fiber system and how to evaluate transmission system performance are importance subjects in the study of an optical fiber communication system.

Based on slowly varying envelope approximation and assumptions of constant polarization state, a transmission equation of pulse evolution in an optical fiber may be described by a nonlinear Schrödinger equation (described by a Manakov equation in random polarization). However, as the nonlinear Schrödinger equation has no analytical solution when a joint action of the nonlinearity and dispersion effects is taken into account, the quantitative study and related theoretical models for the intra-channel nonlinearity are developed and established for an approximate solution of the nonlinear Schrödinger equation. Currently, methods for solving the nonlinear Schrödinger equation are divided into a numerical value solution and an approximate solution. For example, the numerical value solution includes mainly a distributed Fourier algorithm and a time domain finite differential method, and the approximate solution includes mainly an inverse scattering method and a Volterra extension method.

As the wide application of the digital signal processing (DSP) technology in long-haul optical fiber communication systems, performing estimation or compensation on nonlinear distortion of the system in a digital domain becomes an effective method for resisting optical fiber link nonlinearity. As a standard numerical value solution of the nonlinear Schrödinger equation, the distributed Fourier algorithm may be taken as a candidate method for estimating and eliminating nonlinear distortion.

Kaln et al. reviewed nonlinear compensation performance of which a calculation step is equal to a length of an optical fiber span. F. Yaman et al. applied this method to a polarization multiplexing system, in which when the step is less than ⅓ of the optical fiber span, the compensation performance reaches the best. A defect of the distributed Fourier numerical value solution is that the complexity is too high, and even if the step is equal to the length of the optical fiber span, the number of times of calculation of this method poses a challenge to the current DSP technology.

As an approximation analytical method is hopeful to obviously reduce calculation complexity of nonlinear analysis, it draws wide attention of the academe and develops rapidly in these years. Solving the nonlinear Schrödinger equation by using the inverse scattering method may be applicable to educing a soliton solution of a nonlinear transmission system, thereby being applicable to analysis of a soliton communication system. As another method for solving the Schrödinger equation, the Volterra series expansion method enables an analytic framework of a conventional communication system to be lent to an optical fiber communication system, and is relatively universal to different pulse shapes and link types. Paolo Serena obtained a routine perturbation (RP) method based on the Volterra expansion method, and granted relatively definite physical meanings to orders of perturbation, thereby making the method for solving the Schrödinger equation by using perturbation developed rapidly, and multiple theoretical frames being derived from to be applied to quantitative nonlinear distortion in a time domain or a frequency domain.

However, it was found by the inventors in the implementation of the present disclosure that a defect of the prior art exists in that weighting coefficients occupy an important position in nonlinear distortion estimation, but no study is conducted currently on how to obtain a high-precision weighting coefficient, and high-precision estimation cannot be performed on nonlinear distortion in case of loss.

Documents advantageous to the understanding of the present disclosure and conventional technologies are listed below, and are incorporated herein by reference, as they are fully described in this text.

Non-patent document 1: A. Mecozzi et. al., IEEE PTL Vol. 12, No. 4, pp. 392-394, 2000;

Non-patent document 2: G. P. Agrawal, Nonlinear Fiber Optics, $2^{nd}$ ed. New York: Academic, 1995;

Non-patent document 3: K. V. Peddanarappagari et. al., IEEE JLT Vol. 15, pp. 2232-2241, 1997;

Non-patent document 4: IEEE JLT Vol. 16, pp. 2046-2055, 1998;

Non-patent document 5: E. Ip and J. Kahn, IEEE JLT Vol. 26, No. 20, pp. 3416-3425, 2008;

Non-patent document 6: F. Yaman et. al., IEEE Photonics Journal Vol. 1, No. 2, pp. 144-152, 2009;

Non-patent document 7: A. Vannucci et. al., IEEE JLT Vol. 20, No. 7, pp. 1102-1111, 2002

Non-patent document 8: S. Kumar et. al., Optics Express, Vol. 20, No. 25, pp. 27740-27754, 2012

Non-patent document 9: E. Ciaramella et. al., IEEE PTL Vol. 17, No. 1, pp. 91-93, 2005

Non-patent document 10: A. Carena et. al., IEEE JLT Vol. 30, No. 10, pp. 1524-1539, 2012

Non-patent document 11: X. Chen et. al., Optics Express, Vol. 18, No. 18, pp. 19039-19054, 2010

Non-patent document 12: X. Wei, Optics Letters, Vol. 31, No. 17, pp. 2544-2546, 2006.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY

Additional aspects and/or advantages will be set forth in part in the description which follows and, in part, will be apparent from the description, or may be learned by practice of the invention.

Embodiments of the present disclosure provide a calculating apparatus and method for nonlinear weighting coefficient, with an object being to obtain a high-precision weighting coefficient, thereby performing high-precision estimation on nonlinear distortion in case of loss.

According to an aspect of the embodiments of the present disclosure, there is provided a calculating apparatus for nonlinear weighting coefficient, including:

an approximation processing unit configured to use a rational function to perform approximation processing on a link loss/gain function in intra-channel nonlinear distortion estimation; and a coefficient calculating unit configured to calculate a nonlinear weighting coefficient in the nonlinear distortion estimation by using the approximated link loss/gain function and a large dispersion approximation.

According to another aspect of the embodiments of the present disclosure, there is provided a calculating method for nonlinear weighting coefficient, including:

using a rational function to perform approximation processing on a link loss/gain function in intra-channel nonlinear distortion estimation; and processing a nonlinear weighting coefficient in the nonlinear distortion estimation by using the approximated link loss/gain function and a large dispersion approximation.

According to a further aspect of the embodiments of the present disclosure, there is provided a pre-compensating apparatus for nonlinear distortion, including:

the calculating apparatus for nonlinear weighting coefficient as described above;

a perturbation item calculating unit configured to use nonlinear weighting coefficients obtained by the calculating apparatus for nonlinear weighting coefficient to calculate vector perturbation items superimposed on a transmitted signal; and a pre-compensating unit configured to use the vector perturbation items to pre-compensate for the transmitted signal, to obtain a pre-distorted signal inputted into a transmitter.

According to still another aspect of the embodiments of the present disclosure, there is provided a post-compensating apparatus for nonlinear distortion, including:

the calculating apparatus for nonlinear weighting coefficient as described above;

a perturbation item calculating unit configured to use nonlinear weighting coefficients obtained by the calculating apparatus for nonlinear weighting coefficient to calculate vector perturbation items superimposed on a transmitted signal; and a compensating unit configured to use the vector perturbation items to compensate for a received signal.

An advantage of the embodiments of the present disclosure exists in that by using a rational function to perform approximation processing on a link loss/gain function, the nonlinear weighting coefficient is enabled to have an expression of analytic closed solution, thereby obtaining a weighting coefficient of high precision, and performing high-precision estimation on nonlinear distortion in case of loss.

With reference to the following description and drawings, the particular embodiments of the present disclosure are disclosed in detail, and the principles of the present disclosure and the manners of use are indicated. It should be understood that the scope of the embodiments of the present disclosure is not limited thereto. The embodiments of the present disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. To facilitate illustrating and describing some parts of the disclosure, corresponding portions of the drawings may be exaggerated or reduced.

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

DETAILED DESCRIPTION

Figure 1:
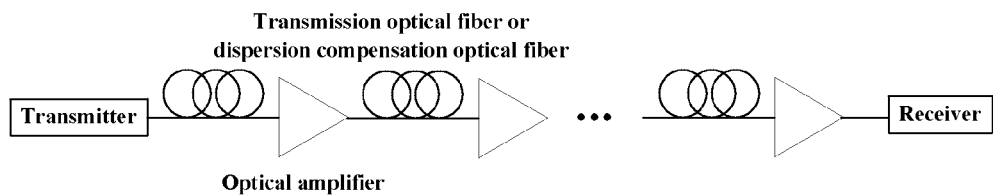
FIG. 1 is a schematic diagram of a typical optical communication system.

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

Various embodiments of the present disclosure shall be described below with reference to the accompanying drawings. These embodiments are illustrative only, and are not intended to limit the present disclosure. For the principles and embodiments of the present disclosure to be understood by those skilled in the art, the embodiments of the present disclosure shall be described taking a polarization multiplexing optical fiber transmission system as an example. However, it should be noted that the present disclosure is not limited thereto, and the embodiments of the present disclosure are applicable to all long-haul optical fiber communication systems.

For a typical long-haul optical fiber transmission system, a nonlinear effect may mainly be fully described by Volterra series less than three orders (such as one-order perturbation), hence, all the currently prevailing nonlinear analysis accepts analytic frameworks of low-order Volterra series expansion, i.e. quasi-linear approximation. In the quasi-linear approximation, the nonlinear perturbation theory develops towards the following branches:

for example, a routine perturbation method: the routine perturbation method based on the quasi-linear approximation approximates the nonlinear distortion by using a one-order perturbation item. The one-order perturbation describes a vector sum of nonlinear distortion to which a dispersion effected pulse is subjected at points in a propagation path, and is analytically expressed as a triple integral in which the integrand is a product of three items of a transmitted pulse; it is shown in theoretical analysis that a numerical value integral of the one-order perturbation has calculation complexity similar to that of the distributed Fourier method; hence, in a case where no integral analytical calculation is performed, the one-order perturbation method is also inapplicable to DSP realization of the nonlinear estimation; in order to further lower the calculation complexity of the routine perturbation method, the triple integral needs to be further analytically operated; currently, only two methods for calculating the triple integral are reported:

(1) a close solution of a lossless large dispersion link: in this method, it is assumed that in a case where the optical fiber transmission link is lossless and accumulated dispersion is sufficiently large while ensuing that a transmission waveform is a Gaussian pulse, the triple integral of the one-order perturbation is strictly integrable, which may be expressed in a form of closed solution of a special function, thereby making that the calculation of the triple integral needs no numerical value integral, and may be achieved directly by using a function table lookup method; although this method may lower the calculation complexity to a large extent, the calculation precision is limited and it is inapplicable to a dispersion management link due to existence of constraints of being lossless and large dispersion; and at the same time, the assumption of the Gaussian pulse further limits the range of application of this method;

(2) a single integral of a lossy large dispersion link: in this method, with an assumption of sufficiently large dispersion, a double integral for time may be calculated by using stationary phase approximation, such that an original triple integral is simplified into a single integral; link loss and pulse waveform are not constrained in this method, but the obtained single integral cannot be usually expressed in a form of closed solution, hence a numeral value integral is still needed to calculate the nonlinear distortion;

or, for example, an enhanced routine perturbation (ERP) method and a multiplicative perturbation model: as the routine perturbation method only takes the one-order perturbation into account, it is usually only applicable to cases where transmission power is very small; in order to further improve the precision of nonlinear distortion estimation when power level is relatively high, extrapolation-based high-order perturbation theory is developed correspondingly; the enhanced routine perturbation method is high-order modification of the routine perturbation method, in which by intuitively introducing a phase-shift factor into the routine one-order perturbation, the precision of the perturbation method in relatively high power level may be obviously improved; the multiplicative perturbation model[9] is another approximation solution taking high-order perturbation into account, and the basic idea of which is to modify additive perturbation into multiplicative perturbation, so as to approximately obtain high-order perturbation items of the routine perturbation method, thereby improving the precision in relatively high power;

or, for example, power spectrum density (PSD) analysis: as the complexity of calculation of a waveform of nonlinear distortion is relatively high, and evaluation of transmission system performance usually only needs to understand statistical characteristics of a nonlinear noise, a current analytic method universal to quasi-linear transmission systems is to deem nonlinear distortion as a noise, and analyze a power spectrum density of the noise; an advantage of such an analytic method exists in that calculation of a double integer may be simplified and it is applicable to analysis of the dispersion management link; however, as it is usually assumed that there exists no correlation between spectra of transmission signals and the Gaussian assumption is satisfied, such a constraint becomes a main factor lowering the precision of the spectrum density analysis.

FIG. 1 is a schematic diagram of a typical optical communication system. For example, a signal transmitted by a transmitter reaches a receiver after passing different devices (an optical fiber, an optical amplifier, and a dispersion compensation optical fiber, etc.) in a transmission link. In the system shown in FIG. 1, in order to compensate for an inputted pulse signal at a transmitter end, an intra-channel nonlinear model may be first established in the implementation of the present disclosure. A basic intra-channel nonlinear model shall be described below in brief. Under an assumption of slow envelope and random polarization rotation, a polarization multiplexing type of optical fiber transmission system may be abstracted as a Manakov equation:

$$\frac{\partial}{\partial z} u_H(t,z) + \frac{\alpha(z)}{2} u_H(t,z) + j\frac{\beta_2(z)}{2}\frac{\partial^2}{\partial t^2} u_H(t,z) = \quad (1)$$

$$j\frac{8}{9}\gamma[|u_H(t,z)|^2 + |u_v(t,z)|^2]u_H(t,z)$$

$$\frac{\partial}{\partial z} u_V(t,z) + \frac{\alpha(z)}{2} u_V(t,z) + j\frac{\beta_2(z)}{2}\frac{\partial^2}{\partial t^2} u_V(t,z) =$$

$$j\frac{8}{9}\gamma(z)[|u_V(t,z)|^2 + |u_H(t,z)|^2]u_V(t,z);$$

where, $u_H(t, z)$ and $u_V(t, z)$ are electrical field components of a signal at the H and V polarization states, respectively, and $\alpha(z)$, $\beta_2(z)$ and $\gamma(z)$ respectively denote distribution of an attenuation coefficient, a dispersion coefficient and a nonlinear coefficient along the transmission distance in an optical fiber link.

A signal generated by the transmitter often includes optical pulses, which may be written in a form of Equation (2):

$$u_H(t, z=0) = \sum_k A_k^H g(t-kT) \quad (2)$$

$$u_V(t, z=0) = \sum_k A_k^V g(t-kT);$$

where, $A^H_k$ and $A^V_k$ are symbol information of a k-th pulse at the H and V polarization states, respectively, T is a pulse interval, and g(t) is a waveform of each pulse.

Take the signal (2) into Equation (1), and an analytic solution of a nonlinear Schrödinger equation at a distance L may be obtained by using the one-order routine perturbation solution under the quasi-linear approximation:

$$u_H(t = kT, z = L) = \quad (3)$$

$$u_H(t=kT, z=0) + \Delta u_H(t=kT, z=L) = u_H(t=kT, z=0) +$$

$$\sum_{m,n}\{[A_{m+k}^H A_{n+k}^H (A_{m+n+k}^H)^* + A_{m+k}^H A_{n+k}^V (A_{m+n+k}^V)^*]C(m,n,z=L)\}$$

$$u_V(t=kT, z=L) = u_V(t=kT, z=0) + \Delta u_V(t=kT, z=L) =$$

$$u_V(t=kT, z=0) +$$

$$\sum_{m,n}\{[A_{m+k}^V A_{n+k}^V (A_{m+n+k}^V)^* + A_{m+k}^V A_{n+k}^H (A_{m+n+k}^H)^*]C(m,n,z=L)\}.$$

It shows in Equation (3) that a perturbation quantity at a k-th pulse sampling moment at a receiver end is a weighted sum of multiple interaction items, each item being a product of a triple product of symbol information of a transmission pulse and a corresponding weighting coefficient. The weighting coefficient is a unique parameter deciding the nonlinear perturbation, and is related to a pulse shape, interaction pulse moments (m, n) and link parameters. When the weighting coefficient may be expressed by an analytic closed solution (an elementary function or a special function which can be calculated by using a table lookup method), the nonlinear distortion ($\Delta u_H$, $\Delta u_V$) may also be obtained according to this closed solution. However, the coefficient may only be expressed in a form of triple integral taking no approximation into account:

$$Coef(m, n, z=L) = \quad (4)$$

$$j\frac{8}{9}\gamma P_0 \int_{-\infty}^{+\infty} \frac{J(C)}{|C|} dC \int_{-\infty}^{+\infty} dt_1 \int_{-\infty}^{+\infty} dt_2 \exp\left(j\frac{t_1 t_2}{C}\right) g(t_1 - mT)$$

$$g(t_2 - nT)g^*(t_1 + t_2 - (m+n)T);$$

where, $C=\int_0^{z=L} \beta_2(z')dz'$ is an accumulated dispersion, and J(C) is a power-weighted dispersion distribution function, which is only decided by a transmission link parameter:

$$J(C) = \sum_i J_i(C) = \sum_i G[z_i(C)]\left|\frac{dz_i(C)}{dC}\right|; \quad (5)$$

where, $G(z_i)$ is a loss/gain function of an i-th optical fiber span.

Figure 2:
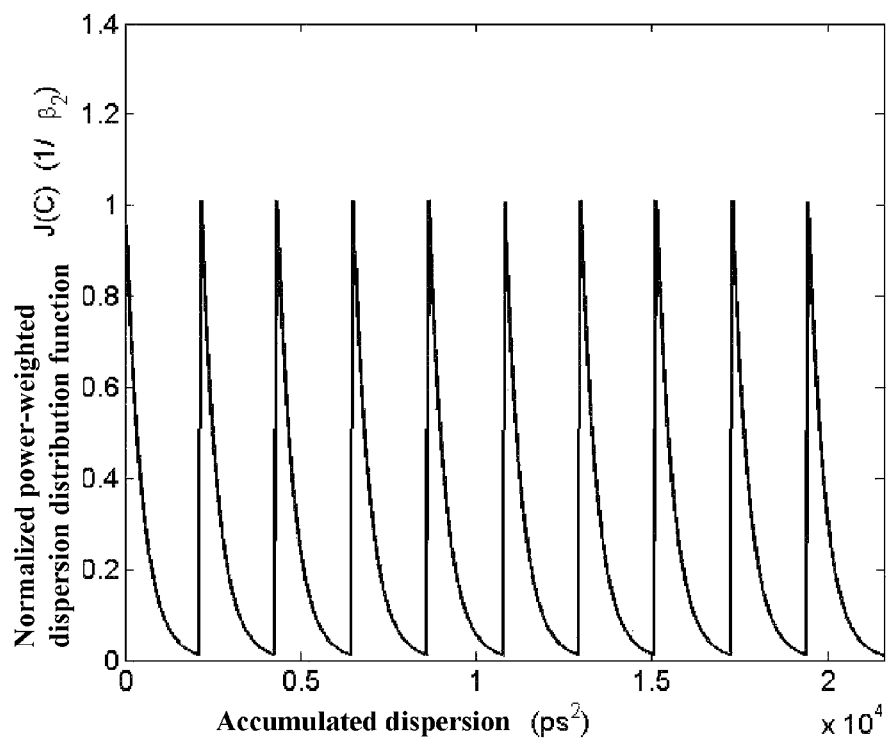
FIG. 2 is a schematic diagram of a power-weighted dispersion distribution function in case of no dispersion compensation.
Figure 3:
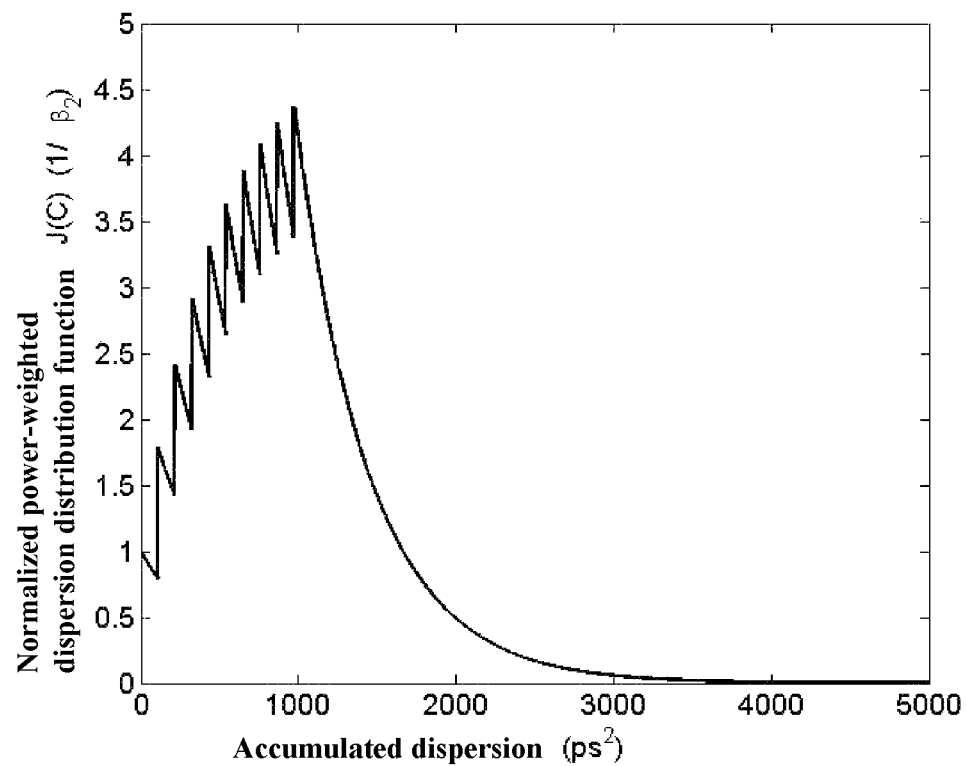
FIG. 3 is a schematic diagram of a power-weighted dispersion distribution function in case of 95% of dispersion compensation.

FIG. 2 is a schematic diagram of a power-weighted dispersion distribution function in case of no dispersion compensation, and FIG. 3 is a schematic diagram of a power-weighted dispersion distribution function in case of 95% of dispersion compensation. As shown in FIGS. 2 and 3, there exist 10 optical fiber spans, a length of each span being 100 km, and $\beta_2(z)$=21.6 ps²/km, $\alpha(z)$=0.2 dB/km.

How to obtain a high-precision weighting coefficient under a loss/gain condition shall be described below in detail.

Embodiment 1

Figure 4:
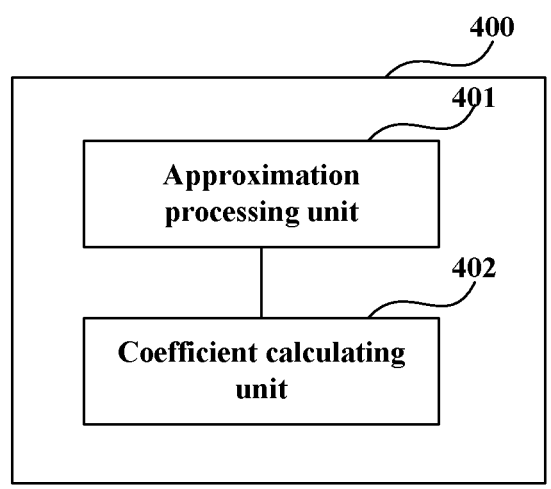
FIG. 4 is a schematic diagram of a structure of the calculating apparatus for nonlinear weighting coefficient of Embodiment 1 of the present disclosure.

An embodiment of the present disclosure provides a calculating apparatus for nonlinear weighting coefficient. FIG. 4 is a schematic diagram of a structure of the calculating apparatus for nonlinear weighting coefficient of the embodiment of the present disclosure. As shown in FIG. 4, the calculating apparatus 400 for nonlinear weighting coefficient includes: an approximation processing unit 401 and a coefficient calculating unit 402.

The approximation processing unit 401 is configured to use a rational function to perform approximation processing on a link loss/gain function in intra-channel nonlinear distortion estimation, and the coefficient calculating unit 402 is configured to calculate a nonlinear weighting coefficient in the nonlinear distortion estimation by using the approximated link loss/gain function and a large dispersion approximation, so as to obtain an analytical closed solution of the nonlinear weighting coefficient.

In this embodiment, approximation processing may be performed on the link loss/gain function by using the rational function, such that the nonlinear weighting coefficient shown in Equation (4) has an expression of an analytic closed solution, and the calculated weighting coefficient is obviously improved with respect to precision.

Figure 5:
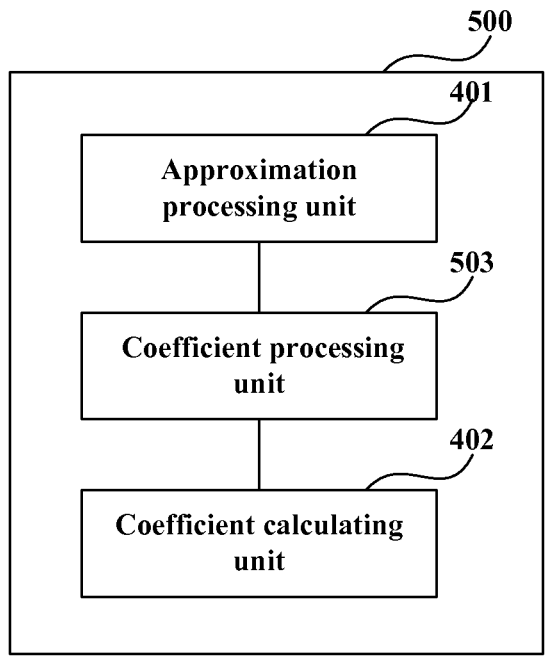
FIG. 5 is another schematic diagram of the structure of the calculating apparatus for nonlinear weighting coefficient of Embodiment 1 of the present disclosure.

FIG. 5 is another schematic diagram of the structure of the calculating apparatus for nonlinear weighting coefficient of the embodiment of the present disclosure. As shown in FIG. 5, the calculating apparatus 500 for nonlinear weighting coefficient includes: an approximation processing unit 401 and a coefficient calculating unit 402, as described above.

As shown in FIG. 5, the calculating apparatus 500 for nonlinear weighting coefficients may further include a coefficient processing unit 503 configured to use a dispersion distribution function to perform integral processing on the nonlinear weighting coefficient in the nonlinear distortion estimation; and the coefficient calculating unit 402 is configured to calculate the integral-processed nonlinear weighting coefficient by using the approximated link loss/gain function and the large dispersion approximation.

In a particular implementation, the coefficient processing unit 503 may be configured to process the triple integral of the nonlinear weighting coefficient shown in Equation (4), so as to express the nonlinear weighting coefficient more intuitively and accurately. And the dispersion distribution function may be used to further integrate the triple integral shown in Equation (4), so as to obtain a form of a single integral, such as obtaining Equation (6) as described later. However, the present disclosure is not limited thereto, and, for example, any other pulse shapes may be employed to obtain other forms of a single integral.

Using the rational function to further perform approximation processing on the link loss/gain function is described above. Furthermore, nonlinear weighting coefficients of multiple optical fiber spans may be calculated respectively in the present disclosure, and after summation, the nonlinear weighting coefficient of the whole link may be obtained.

Figure 6:
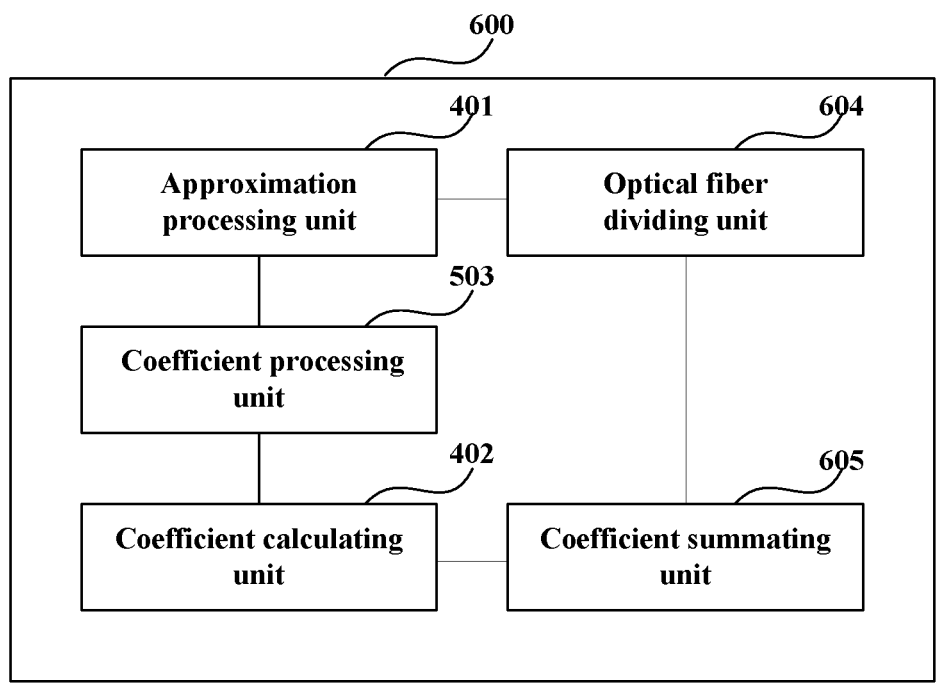
FIG. 6 is a further schematic diagram of the structure of the calculating apparatus for nonlinear weighting coefficient of Embodiment 1 of the present disclosure.

FIG. 6 is a further schematic diagram of the structure of the calculating apparatus for nonlinear weighting coefficient of the embodiment of the present disclosure. As shown in FIG. 6, the calculating apparatus 600 for nonlinear weighting coefficient includes: an approximation processing unit 401, a coefficient calculating unit 402, and a coefficient processing unit 503, as described above.

As shown in FIG. 6, the calculating apparatus 600 for nonlinear weighting coefficients may further include an optical fiber dividing unit 604 and a coefficient summating unit 605. The optical fiber dividing unit 604 is configured to divide an optical fiber of the whole transmission link into multiple optical fiber spans;

and for each of the optical fiber spans, a nonlinear weighting coefficient to which the optical fiber span corresponds is calculated, by the approximation processing unit 401 and the coefficient calculating unit 402, or, by the approximation processing unit 401, the coefficient processing unit 503 and the coefficient calculating unit 402;

and the coefficient summating unit 605 is configured to perform summation of the nonlinear weighting coefficients of the respective obtained different optical fiber spans, so as to obtain an analytical closed solution of the nonlinear weighting coefficient of the whole transmission link.

In this embodiment, the approximation processing unit 401 is further configured to use a Gaussian pulse function, or a non-return-to-zero (NRZ) pulse function, or a return-to-zero (RZ) pulse function, or a Nyquist pulse function, etc., to approximate pulse shapes in the intra-channel nonlinear distortion estimation. However, the present disclosure is not limited thereto, and, for example, other pulse shapes may also be employed, and the present disclosure may be applicable to any other pulse shape. The present disclosure may be described below in detail only taking that the pulse shape is of a Gaussian pulse as an example.

For example, the present disclosure may be described in detail when the pulse shape is of a Gaussian pulse $g(t)=\exp[-t^2/(2\tau^2)]$ ($\tau$ is a pulse width factor of the Gaussian pulse), a standard optical fiber attenuation $G(z_n)=\exp(-\alpha z_i)$ and a dispersion compensation rate $\eta$ (in a link of no dispersion compensation, $\eta=0$). However, the present disclosure is not limited to a Gaussian pulse and a standard optical fiber attenuation link, etc., and a particular implementation may be determined according to an actual situation.

In a particular implementation, the coefficient processing unit 503 may be configured to take the above conditions into Equation (5), so as to obtain:

$$J_i(C) = \exp[-\alpha(C/\beta_2 - (i-1)(1-\eta)L_{span})]/|\beta_2|;$$

where, $L_{span}$ is a length of each of the optical fiber span.

For the Gaussian pulse, the coefficient processing unit 503 may be configured to obtain the following by first integrating t1 and t2 by using Equation (4):

$$Coef(m, n, z = L) = \qquad (6)$$

$$j\frac{8}{9}\gamma P_0 \sum_i \int_{-\infty}^{+\infty} \frac{\exp[-\alpha z_i(C)]}{\beta_2 \sqrt{1 + 2jC/\tau^2 + 3(C/\tau^2)^2}} \exp$$

$$\left\{ -\frac{3mnT^2}{\tau^2(1 + 3jC/\tau^2)} - \frac{(m-n)^2 T^2}{\tau^2[1 + 2jC/\tau^2 + 3(C/\tau^2)^2]} \right\} dC.$$

The above equation denotes that for the Gaussian pulse, the weighting coefficient may be simplified into a single integral, which has no analytical closed solution, and must be made integrable by further applying an approximation condition.

In a particular implementation, the approximation processing unit 401 may be configured to approximate the standard optical fiber attenuation $G(z_n)=\exp(-\alpha z_n)$ by using the rational function, and may perform approach on an exponential attenuation function by using the following rational fraction:

$$G(z_i) = \exp(-\alpha z_i) \approx \frac{(N/\alpha)^N}{(z_i + N/\alpha)^N} = \left(\frac{N}{\alpha z_i + N}\right)^N; \qquad (7)$$

where, N is an attenuation control factor, $\alpha$ is an attenuation coefficient of the optical fiber, i is an optical fiber span index, and $z_i$ is a transmission distance in an i-th section of the optical fiber.

It should be noted that the approximation processing is performed by using the above rational function taking only the exponential attenuation function as an example. However, the present disclosure is not limited thereto, and other forms of rational functions may be used for other forms of functions, and a particular implementation may be determined according to an actual situation. And the pulse shape is also not only limited to the Gaussian pulse or the examples of pulses enumerated above, and the present disclosure may be applicable to any other pulse shapes.

Figure 7:
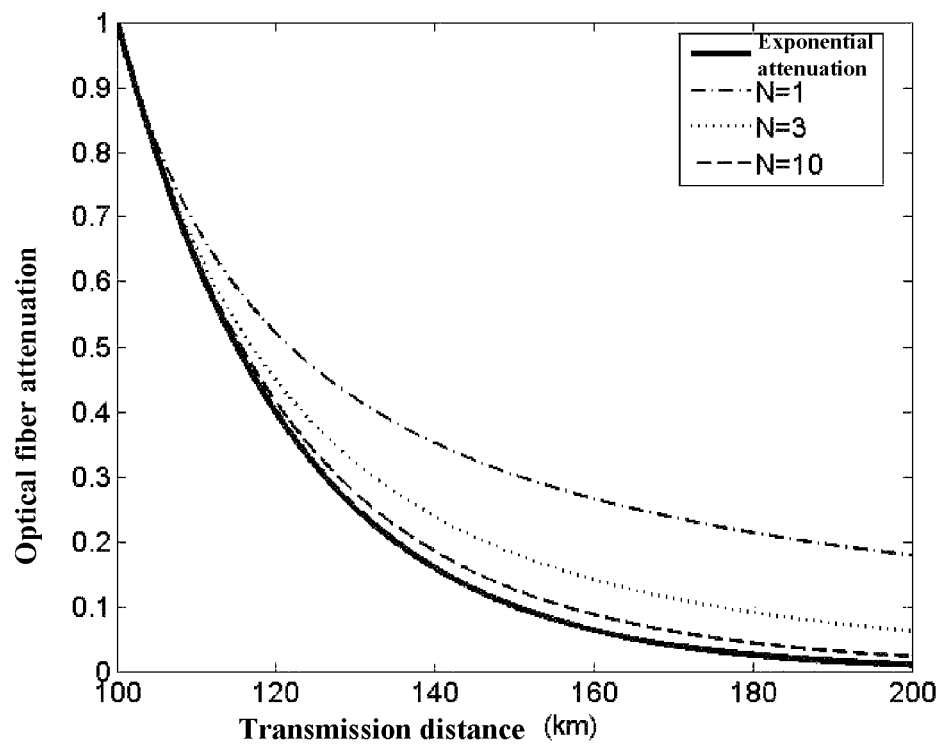
FIG. 7 is a schematic diagram of an approximation attenuation function of Embodiment 1 of the present disclosure.

FIG. 7 is a schematic diagram of an approximation attenuation function of the embodiment of the present disclosure. As shown in FIG. 7, a tendency of the approximation function approaching the exponential attenuation function in a second optical fiber span (a length of each span is 100 km, and α(z)=0.2 dB/km) is shown. As shown in FIG. 7, when N is sufficiently large, the approximation function may accurately approach the exponential attenuation function.

In a particular implementation, the coefficient calculating unit 402 may be configured to take Equation (7) into Equation (6), and introduce a large dispersion approximation (C<<τ²) to further calculate the integral.

The coefficient summating unit 605 may be configured to perform summation of the nonlinear weighting coefficients of the respective obtained different optical fiber spans, so as to obtain an analytical closed solution of the nonlinear weighting coefficient:

$$Coef(mn) = -\gamma P_0 \frac{\tau^2}{\sqrt{3}\beta_2} aA^{-N} \sum_n \frac{e^{j/B_i}}{B_i^{N-1}} \sum_{k=1}^{N} (-)^{k+N} \binom{N-1}{k-1} \quad (8)$$

$$\left(\frac{j}{B_i}\right)^k \left[\Gamma\left(1-k, jA\left(\frac{1}{AB_i} - \frac{1}{(i-1)(1-\eta)L+L}\right)\right) - \Gamma\left(1-k, jA\left(\frac{1}{AB_i} - \frac{1}{(i-1)(1-\eta)L}\right)\right)\right];$$

where, a=N/α, $b_i$=−N/α+(i−1)(1−η)L, $$A = \frac{T_n T_m}{\beta_2},$$

$B_i = b_i/A$, and $\Gamma(\cdot,\cdot)$ is an incomplete Gamma function. The above Equation (8) is an expression of the analytical closed solution of the nonlinear weighting coefficient of the lossy link.

In this embodiment, calculation is performed for different optical fiber spans respectively starting from the power-weighted dispersion distribution function J(C) of the transmission link, thereby making the calculation of the nonlinear weighting coefficient applicable not only to a link of no dispersion compensation, but also to a dispersion management link.

For the approximation of the link loss/gain function, the present disclosure proposes to use the rational function to perform approximation approach, so as to make the integral expression (6) had an expression of an analytical closed solution. And for an actual standard attenuation link, the weighting coefficient obtained through calculation by using Equation (8) is obviously improved with respect to precision over the methods in the prior art.

It should be noted that the present disclosure is not limited to being applicable to a standard attenuation link, and is also applicable to a link having an exponential gain or attenuation/gain functions of other forms. And it is also one of the obvious advantages of the present disclosure that it is compatible with other pulse shapes and is of high precision.

It can be seen from the above embodiment that approximation is performed on the link loss/gain function by using the rational function, thereby making the nonlinear weighting coefficient had an expression of an analytical closed solution; and a weighting coefficient of high precision may be obtained, thereby performing high-precision estimation on the nonlinear distortion in case of loss.

Furthermore, the optical fiber of the whole transmission link is divided into multiple different optical fiber spans and the nonlinear weighting coefficients for different optical fiber spans are calculated respectively, thereby making the calculation of the nonlinear weighting coefficient applicable not only to a link of no dispersion compensation, but also to a dispersion management link.

Embodiment 2

An embodiment of the present disclosure provides a calculating method for nonlinear weighting coefficient, corresponding to the calculating apparatus for nonlinear weighting coefficient according to Embodiment 1, with identical contents being not going to be described any further.

Figure 8:
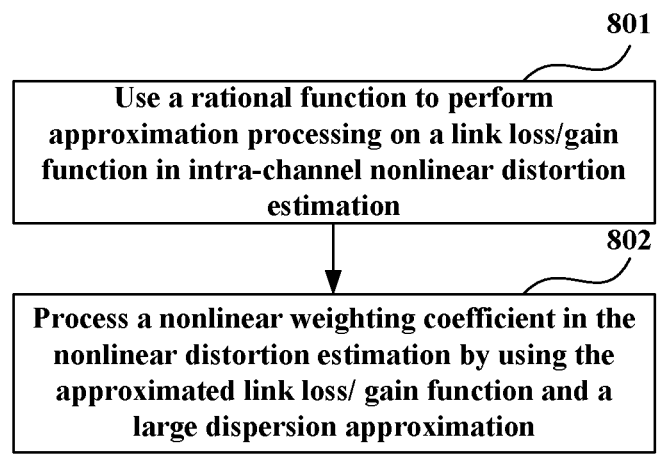
FIG. 8 is a flowchart of the calculating method for nonlinear weighting coefficient of Embodiment 2 of the present disclosure.

FIG. 8 is a flowchart of the calculating method for nonlinear weighting coefficient of the embodiment of the present disclosure. As shown in FIG. 8, the calculating method for nonlinear weighting coefficient includes:

step 801: using a rational function to perform approximation processing on a link loss/gain function in intra-channel nonlinear distortion estimation; and step 802: processing a nonlinear weighting coefficient in the nonlinear distortion estimation by using the approximated link loss/gain function and a large dispersion approximation.

Figure 9:
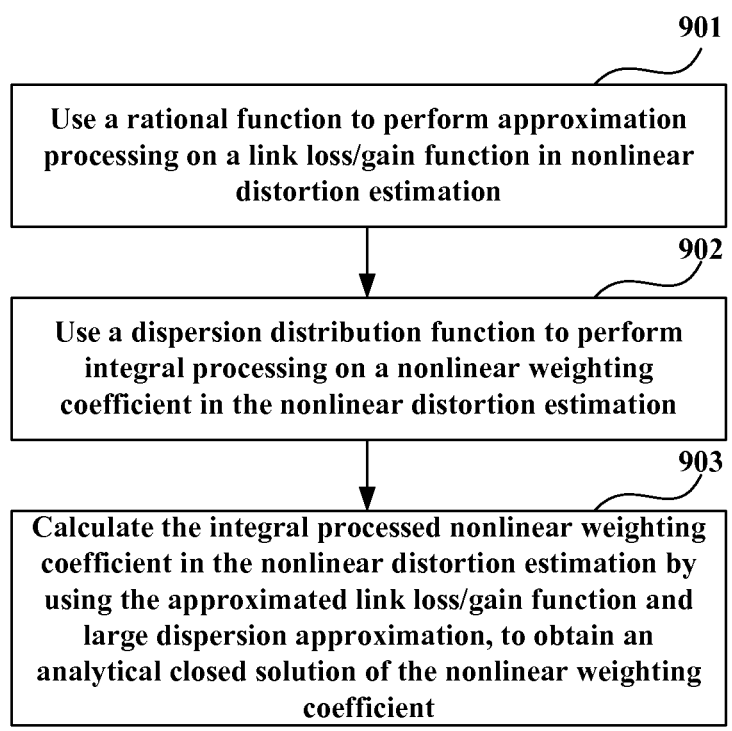
FIG. 9 is another flowchart of the calculating method for nonlinear weighting coefficient of Embodiment 2 of the present disclosure.

FIG. 9 is another flowchart of the calculating method for nonlinear weighting coefficient of the embodiment of the present disclosure. As shown in FIG. 9, the calculating method for nonlinear weighting coefficient includes:

step 901: using a rational function to perform approximation processing on a link loss/gain function in nonlinear distortion estimation;

step 902: using a dispersion distribution function to perform integral processing on a nonlinear weighting coefficient in the nonlinear distortion estimation; and step 903: calculating the integral processed nonlinear weighting coefficient in the nonlinear distortion estimation by using the approximated link loss/gain function and a large dispersion approximation, so as to obtain an analytical closed solution of the nonlinear weighting coefficient.

Using the rational function to further perform approximation processing on the link loss/gain function is described above. Furthermore, nonlinear weighting coefficients of multiple optical fiber spans are calculated respectively in the present disclosure, and after summation, the nonlinear weighting coefficient of the whole link is obtained.

Figure 10:
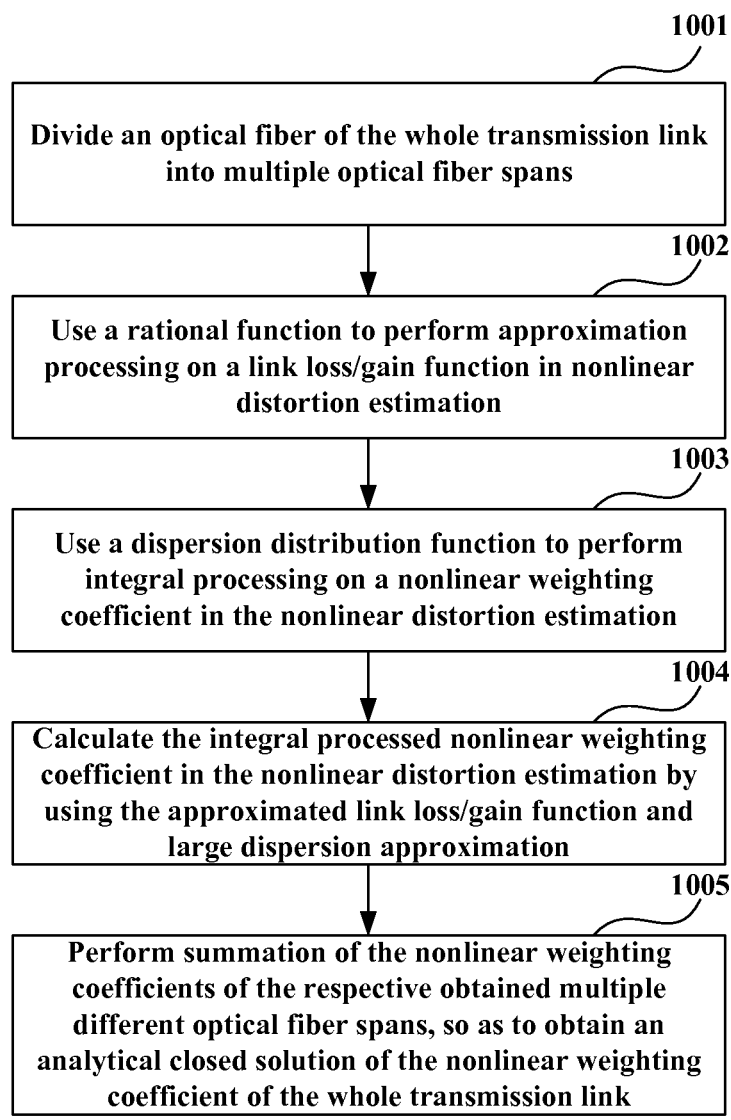
FIG. 10 is a further flowchart of the calculating method for nonlinear weighting coefficient of Embodiment 2 of the present disclosure.

FIG. 10 is a further flowchart of the calculating method for nonlinear weighting coefficient of the embodiment of the present disclosure. As shown in FIG. 10, the calculating method for nonlinear weighting coefficient includes:

step 1001: dividing an optical fiber of the whole transmission link into multiple optical fiber spans;

for each of the optical fiber spans, following steps 1002 to 1004 are executed:

step 1002: using a rational function to perform approximation processing on a link loss/gain function in nonlinear distortion estimation;

step 1003: using a dispersion distribution function to perform integral processing on a nonlinear weighting coefficient in the nonlinear distortion estimation; and step 1004: calculating the integral processed nonlinear weighting coefficient in the nonlinear distortion estimation by using the approximated link loss/gain function and a large dispersion approximation;

and after respectively obtaining the nonlinear weighting coefficients of the multiple different optical fiber spans, following step 1005 is executed:

step 1005: performing summation of the nonlinear weighting coefficients of the respective obtained multiple different optical fiber spans, so as to obtain an analytical closed solution of the nonlinear weighting coefficient of the whole transmission link. It can be seen from the above embodiment that approximation is performed on the link loss/gain function by using the rational function, thereby making the nonlinear weighting coefficient had an expression of an analytical closed solution; and a weighting coefficient of high precision may be obtained, thereby performing high-precision estimation on the nonlinear distortion in case of loss.

Furthermore, the optical fiber of the whole transmission link is divided into multiple different optical fiber spans and the nonlinear weighting coefficients for different optical fiber spans are calculated respectively, thereby making the calculation of the nonlinear weighting coefficient applicable not only to a link of no dispersion compensation, but also to a dispersion management link.

Embodiment 3

Figure 11:
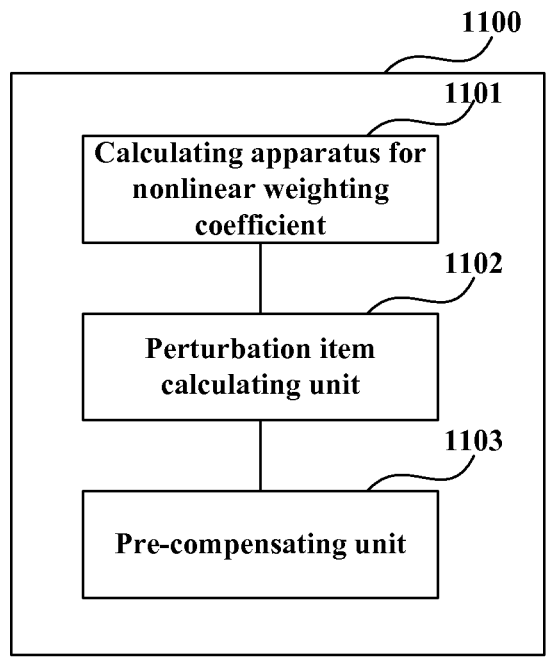
FIG. 11 is a schematic diagram of a structure of the pre-compensating apparatus for nonlinear distortion of Embodiment 3 of the present disclosure.

An embodiment of the present disclosure provides a pre-compensating apparatus and method for nonlinear distortion. FIG. 11 is a schematic diagram of a structure of the pre-compensating apparatus for nonlinear distortion of the embodiment of the present disclosure. As shown in FIG. 11, the pre-compensating apparatus 1100 for nonlinear distortion includes a calculating apparatus 1101 for nonlinear weighting coefficient, a perturbation item calculating unit 1102 and a pre-compensating unit 1103.

The calculating apparatus 1101 for nonlinear weighting coefficient may be configured according to Embodiment 1, the perturbation item calculating unit 1102 is configured to use nonlinear weighting coefficients obtained by the calculating apparatus 1101 for nonlinear weighting coefficient to calculate vector perturbation items superimposed on a transmitted signal, and the pre-compensating unit 1103 is configured to use the vector perturbation items to pre-compensate for the transmitted signal, so as to obtain a pre-distorted signal inputted into a transmitter.

In this embodiment, a basic idea of the pre-compensating method is to transmit specifically deformed signals, and after these signals experience a nonlinear effect of the optical fiber transmission, ideal lossless signals are obtained at a receiver end. It should be noted that it is assumed in this embodiment that a linear damage of a channel has been compensated for in other manners.

In this embodiment, the vector perturbation superimposed on the transmitted signal may be accurately calculated by using the above calculating method for nonlinear weighting coefficient, thereby achieving pre-compensation of the nonlinear distortion by using a method in which the vector perturbation is deducted in advance at the transmitter. An information sequence obtained by pre-compensation is calculated by using the method below:

$$A'^H_k = A^H_k - \xi \sum_{m,n} [A^H_{m+k} A^H_{n+k} (A^H_{m+n+k})^* + A^H_{m+k} A^V_{n+k} (A^V_{m+n+k})^*] \quad (9)$$

$$Coef(m, n, z = L)$$

$$A'^V_k = A^V_k - \xi \sum_{m,n} [A^V_{m+k} A^V_{n+k} (A^V_{m+n+k})^* + A^V_{m+k} A^H_{n+k} (A^H_{m+n+k})^*]$$

$$Coef(m, n, z = L);$$

where, $A'^H_k$ and $A'^V_k$ are symbol information at a k-th moment at the two polarization states, respectively, $A^H_k$ and $A^V_k$ are original symbol information at the k-th moment at the two polarization states, respectively, and $\xi$ is a pre-compensation adjustment constant. Equation (9) may be understood as that the pre-compensated information sequence is equal to an original information sequence subtracted by vector perturbation items produced by the nonlinear effect at a distance L. For example, calculation of a weighting coefficient Coef(m,n,z=L) may be performed according to Embodiment 1 or Embodiment 2.

Figure 12:
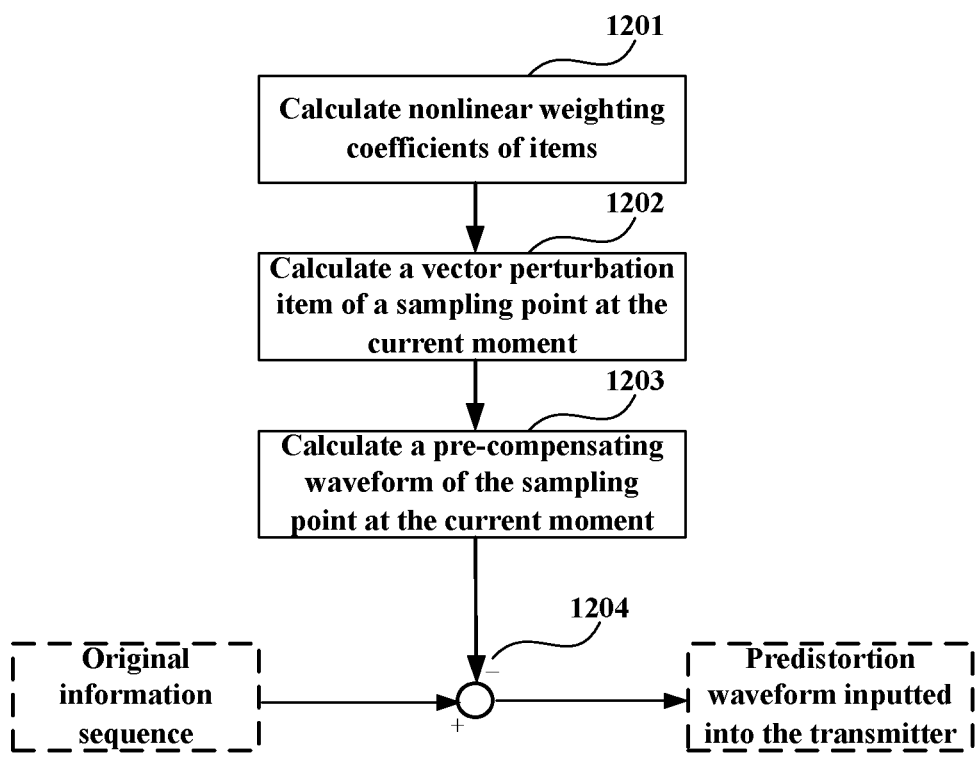
FIG. 12 is a flowchart of the pre-compensating method for nonlinear distortion of Embodiment 3 of the present disclosure.

FIG. 12 is a flowchart of the pre-compensating method for nonlinear distortion of the embodiment of the present disclosure. As shown in FIG. 12, the pre-compensating method for nonlinear distortion includes:

step 1201: calculating nonlinear weighting coefficients of items;

in particular implementation, for the signal shown in Equation (9), the nonlinear weighting coefficient of each of the items may be calculated by using the calculating method or apparatus for nonlinear weighting coefficient according to Embodiment 1 or Embodiment 2;

step 1202: calculating a vector perturbation item of a sampling point at the current moment;

step 1203: calculating a pre-compensating waveform of the sampling point at the current moment; and step 1204: pre-compensating for the original information sequence, so as to obtain a predistortion waveform inputted into the transmitter.

It can be seen from the above embodiment that by using the above calculating method for nonlinear weighting coefficient to perform pre-compensation, the vector perturbation superimposed on the transmitted signal may be more accurately calculated, thereby achieving pre-compensation of the nonlinear distortion by using a method in which the vector perturbation is deducted in advance at the transmitter.

Embodiment 4

Figure 13:
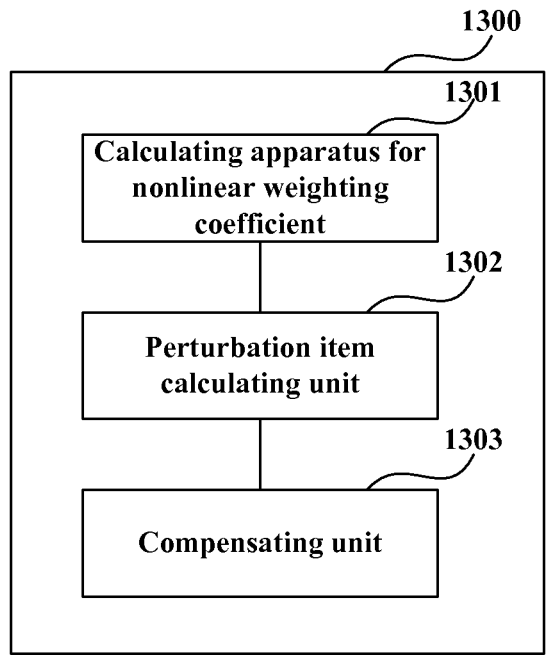
FIG. 13 is a schematic diagram of a structure of the post-compensating apparatus for nonlinear distortion of Embodiment 4 of the present disclosure.

An embodiment of the present disclosure provides a post-compensating apparatus for nonlinear distortion. FIG. 13 is a schematic diagram of a structure of the post-compensating apparatus for nonlinear distortion of the embodiment of the present disclosure. As shown in FIG. 13, the post-compensating apparatus 1300 for nonlinear distortion includes a calculating apparatus 1301 for nonlinear weighting coefficient, a perturbation item calculating unit 1302 and a compensating unit 1303.

The calculating apparatus 1301 for nonlinear weighting coefficient may be configured according to Embodiment 1, the perturbation item calculating unit 1302 is configured to use nonlinear weighting coefficients obtained by the calculating apparatus 1301 for nonlinear weighting coefficient to calculate vector perturbation items superimposed on a transmitted signal, and the compensating unit 1303 is configured to use the vector perturbation items to compensate for a received signal.

In this embodiment, the vector perturbation items superimposed on the ideal transmitted signal may be calculated by using the above calculating method for nonlinear weighting coefficient according to Embodiment 1 or Embodiment 2. In an ideal link of no noise, the vector perturbation items obtained by calculation may relatively accurately reflect a size of distortion of a sampling point at the receiver end. Hence, this part of vector perturbation items may be directly deducted at the receiver end, and a compensated information sequence is obtained, which is described by the equation below:

$$R'^H_k = R^H_k - \xi \sum_{m,n} [R^H_{m+k} R^H_{n+k} (R^H_{m+n+k})^* + R^H_{m+k} R^V_{n+k} (R^V_{m+n+k})^*] \quad (10)$$

$$Coef(m, n, z = L)$$

$$R'^V_k = R^V_k - \xi \sum_{m,n} [R^V_{m+k} R^V_{n+k} (R^V_{m+n+k})^* + R^V_{m+k} R^H_{n+k} (R^H_{m+n+k})^*]$$

$$Coef(m, n, z = L);$$

where, $R'^H_k$ and $R'^V_k$ are sampling point information at the k-th moment at the two polarization states after being compensated by the receiver, respectively, and $R^H_k$ and $R^V_k$ are sampling point information inputted into the post-compensating apparatus at the k-th moment after the receiver compensates for other damages, respectively.

Figure 14:
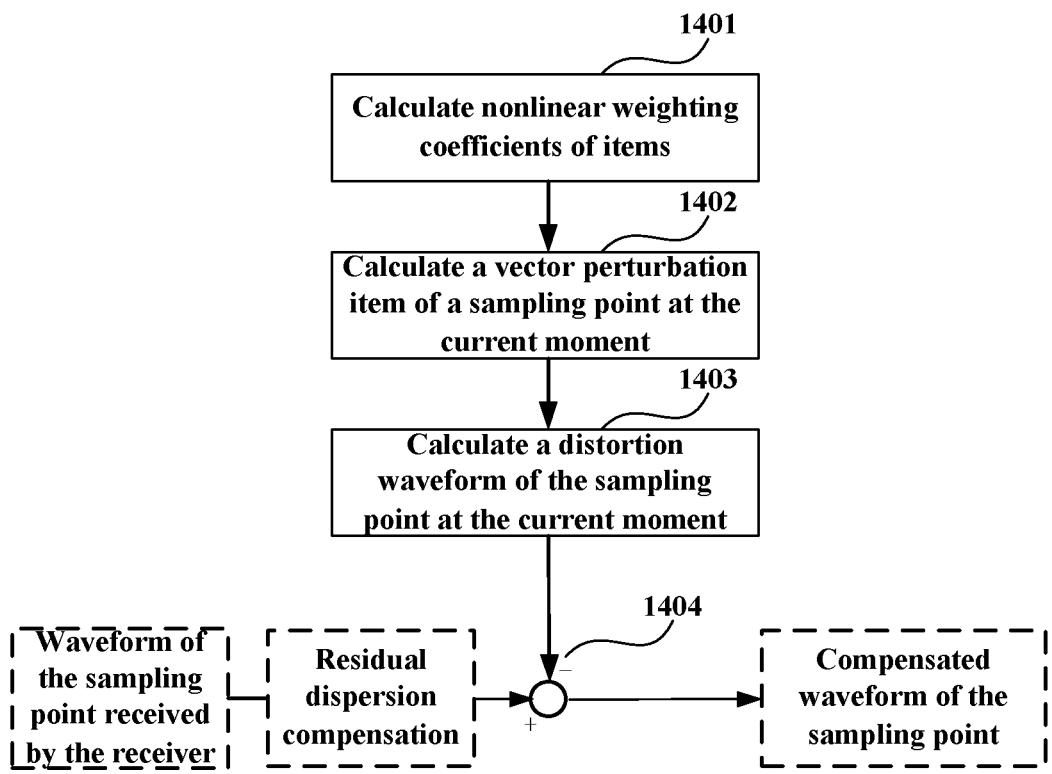
FIG. 14 is a flowchart of the post-compensating method for nonlinear distortion of Embodiment 4 of the present disclosure.

FIG. 14 is a flowchart of the post-compensating method for nonlinear distortion of the embodiment of the present disclosure. As shown in FIG. 14, the post-compensating method for nonlinear distortion includes:

step 1401: calculating nonlinear weighting coefficients of items;

in particular implementation, for the signal shown in Equation (10), the nonlinear weighting coefficient of each of the items may be calculated by using the calculating method or apparatus for nonlinear weighting coefficient according to Embodiment 1 or Embodiment 2;

step 1402: calculating a vector perturbation item of a sampling point at the current moment;

step 1403: calculating a distortion waveform of the sampling point at the current moment; and step 1404: compensating for the waveform of the sampling point received by the receiver, so as to obtain a compensated waveform of the sampling point.

It can be seen from the above embodiment that by using the above calculating method for nonlinear weighting coefficient to perform compensation, the vector perturbation superimposed on the transmitted signal may be more accurately calculated, thereby achieving compensation of the nonlinear distortion by using a method in which the vector perturbation is deducted at the receiver.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the principles of the present disclosure, and such variants and modifications fall within the scope of the present disclosure.

As for implementations including the above embodiments, following supplements are further disclosed.

Supplement 1. A calculating apparatus for nonlinear weighting coefficient, including:
an approximation processing unit configured to use a rational function to perform approximation processing on a link loss/gain function in intra-channel nonlinear distortion estimation; and
a coefficient calculating unit configured to calculate a nonlinear weighting coefficient in the nonlinear distortion estimation by using the approximated link loss/gain function and a large dispersion approximation.

Supplement 2. The calculating apparatus for nonlinear weighting coefficient according to supplement 1, wherein the calculating apparatus for nonlinear weighting coefficient further includes:
a coefficient processing unit configured to use a dispersion distribution function to perform integral processing on the nonlinear weighting coefficient in the nonlinear distortion estimation;
and the coefficient calculating unit is configured to calculate the integral-processed nonlinear weighting coefficient by using the approximated link loss/gain function and the large dispersion approximation.

Supplement 3. The calculating apparatus for nonlinear weighting coefficient according to supplement 1 or 2, wherein the calculating apparatus for nonlinear weighting coefficient further includes:
an optical fiber dividing unit configured to divide an optical fiber of the whole transmission link into multiple optical fiber spans; and
a coefficient summating unit configured to perform summation of the nonlinear weighting coefficients of the respective obtained different optical fiber spans, to obtain an analytical closed solution of the nonlinear weighting coefficient of the whole transmission link.

Supplement 4. The calculating apparatus for nonlinear weighting coefficient according to supplement 1 or 2, wherein the approximation processing unit is further configured to use a Gaussian pulse function, or a non-return-to-zero pulse function, or a return-to-zero pulse function, or a Nyquist pulse function, to approximate pulse shapes in the intra-channel nonlinear distortion estimation.

Supplement 5. The calculating apparatus for nonlinear weighting coefficient according to supplement 3, wherein the approximation processing unit is configured to use the following equation to perform approximation processing on the link loss/gain function:

$$G(z_i) = \exp(-\alpha z_i) \approx \frac{(N/\alpha)^N}{(z_i + N/\alpha)^N} = \left(\frac{N}{\alpha z_i + N}\right)^N;$$

where, $G(z_i)$ is the link loss/gain function, N is an attenuation control factor, $\alpha$ is an attenuation coefficient of the optical fiber, and $z_i$ is a transmission distance in an i-th section of the optical fiber.

Supplement 6. A calculating method for nonlinear weighting coefficient, including:
using a rational function to perform approximation processing on a link loss/gain function in intra-channel nonlinear distortion estimation; and
processing a nonlinear weighting coefficient in the nonlinear distortion estimation by using the approximated link loss/gain function and a large dispersion approximation, to obtain an analytical closed solution of the nonlinear weighting coefficient.

Supplement 7. The calculating method for nonlinear weighting coefficient according to supplement 6, wherein the calculating method for nonlinear weighting coefficient further includes:
using a dispersion distribution function to perform integral processing on the nonlinear weighting coefficient in the nonlinear distortion estimation; and
calculating the integral processed nonlinear weighting coefficient by using the approximated link loss/gain function and the large dispersion approximation.

Supplement 8. The calculating method for nonlinear weighting coefficient according to supplement 6 or 7, wherein the calculating method for nonlinear weighting coefficient further includes:
dividing an optical fiber of the whole transmission link into multiple optical fiber spans; and
performing summation of the nonlinear weighting coefficients of the respective obtained multiple different optical fiber spans, to obtain an analytical closed solution of the nonlinear weighting coefficient of the whole transmission link.

Supplement 9. The calculating method for nonlinear weighting coefficient according to supplement 6 or 7, wherein a Gaussian pulse function, or a non-return-to-zero pulse function, or a return-to-zero pulse function, or a Nyquist pulse function, to approximate pulse shapes in the intra-channel nonlinear distortion estimation.

Supplement 10. The calculating method for nonlinear weighting coefficient according to supplement 6, wherein the following equation is used to perform approximation processing on the link loss/gain function:

$$G(z_i) = \exp(-\alpha z_i) \approx \frac{(N/\alpha)^N}{(z_i + N/\alpha)^N} = \left(\frac{N}{\alpha z_i + N}\right)^N;$$

where, $G(z_i)$ is the link loss/gain function, $N$ is an attenuation control factor, $\alpha$ is an attenuation coefficient of the optical fiber, and $z_i$ is a transmission distance in an i-th section of the optical fiber.

Supplement 11. A pre-compensating apparatus for nonlinear distortion, including:
the calculating apparatus for nonlinear weighting coefficient as described in any one of supplements 1-5;
a perturbation item calculating unit configured to use nonlinear weighting coefficients obtained by the calculating apparatus for nonlinear weighting coefficient to calculate vector perturbation items superimposed on a transmitted signal; and
a pre-compensating unit configured to use the vector perturbation items to pre-compensate for the transmitted signal, so as to obtain a pre-distorted signal inputted into a transmitter.

Supplement 12. A pre-compensating method for nonlinear distortion, including:
the step of calculating the nonlinear weighting coefficient as described in any one of supplements 6-10;
using the nonlinear weighting coefficients obtained by the step of calculating the nonlinear weighting coefficients to calculate vector perturbation items superimposed on a transmitted signal; and
using the vector perturbation items to pre-compensate for the transmitted signal, so as to obtain a pre-distorted signal inputted into a transmitter.

Supplement 13. A post-compensating apparatus for nonlinear distortion, including:
the calculating apparatus for nonlinear weighting coefficient as described in any one of supplements 1-5;
a perturbation item calculating unit configured to use nonlinear weighting coefficients obtained by the calculating apparatus for nonlinear weighting coefficient to calculate vector perturbation items superimposed on a transmitted signal; and
a compensating unit configured to use the vector perturbation items to compensate for a received signal.

Supplement 14. A post-compensating method for nonlinear distortion, including:
the step of calculating the nonlinear weighting coefficients as described in any one of supplements 6-10;
using nonlinear weighting coefficients obtained by the calculating apparatus for nonlinear weighting coefficient to calculate vector perturbation items superimposed on a transmitted signal; and
using the vector perturbation items to compensate for a received signal.

Supplement 15. A non-transitory computer-readable program, wherein when the program is executed in a transmitter, the program enables a computer to carry out the pre-compensating method for nonlinear distortion according to supplement 12 in the transmitter.

Supplement 16. A non-transitory storage medium in which a computer-readable program is stored, wherein the computer-readable program enables a computer to carry out the pre-compensating method for nonlinear distortion according to supplement 12 in a transmitter.

Supplement 17. A non-transitory computer-readable program, wherein when the program is executed in a receiver, the program enables a computer to carry out the post-compensating method for nonlinear distortion according to supplement 14 in the receiver.

Supplement 18. A storage medium in which a computer-readable program is stored, wherein the computer-readable program enables a computer to carry out the post-compensating method for nonlinear distortion according to supplement 14 in a receiver.

Although a few embodiments have been shown and described, it would be appreciated by those skilled in the art that changes may be made in these embodiments without departing from the principles and spirit of the invention, the scope of which is defined in the claims and their equivalents.

The invention claimed is:

1. A calculating apparatus for a nonlinear weighting coefficient, comprising:
a digital signal processor,
the digital signal processor is configured to:
divide an optical fiber of a transmission link into multiple optical fiber spans;
for each optical fiber span, use a rational function to perform approximation processing on a link loss/gain function in intra-channel nonlinear distortion estimation;

calculate one or more nonlinear weighting coefficients in the nonlinear distortion estimation by using an approximated link loss/gain function and a dispersion approximation; and perform summation of nonlinear weighting coefficients of respective obtained different optical fiber spans, to obtain an analytical closed solution of the nonlinear weighting coefficient of the transmission link, wherein the processor is further configured to use an equation to perform approximation processing on the link loss/gain function, the equation comprising:

$$G(z_i) = \exp(-\alpha z_i) \approx \frac{(N/\alpha)^N}{(z_i + N/\alpha)^N} = \left(\frac{N}{\alpha z_i + N}\right)^N;$$

wherein, $G(z_i)$ is the link loss/gain function, N is an attenuation control factor, $\alpha$ is an attenuation coefficient of the optical fiber, and $z_i$ is a transmission distance in an i-th section of the optical fiber.

2. The calculating apparatus for the nonlinear weighting coefficient according to claim 1, wherein the processor is further configured to:
use a dispersion distribution function to perform integral processing on the nonlinear weighting coefficient in the nonlinear distortion estimation; and
calculate an integral-processed nonlinear weighting coefficient by using the approximated link loss/gain function and the large dispersion approximation.

3. The calculating apparatus for the nonlinear weighting coefficient according to claim 1, wherein the processor is further configured to use one of the functions as follows a Gaussian pulse function and a non-return-to-zero pulse function and a return-to-zero pulse function and a Nyquist pulse function, to approximate pulse shapes in the intra-channel nonlinear distortion estimation.

4. A pre-compensating apparatus for a nonlinear distortion, comprising:
a digital signal processor,
the digital signal processor is configured to:
divide an optical fiber of a transmission link into multiple optical fiber spans;
for each optical fiber span, use a rational function to perform approximation processing on a link loss/gain function in intra-channel nonlinear distortion estimation;
calculate one or more nonlinear weighting coefficients in the nonlinear distortion estimation by using an approximated link loss/gain function and a dispersion approximation;
perform summation of nonlinear weighting coefficients of respective obtained different optical fiber spans, to obtain an analytical closed solution of the nonlinear weighting coefficient of the transmission link;
use the nonlinear weighting coefficients to calculate vector perturbation items superimposed on a transmitted signal; and
use the vector perturbation items to pre-compensate the transmitted signal to obtain a pre-distorted signal inputted into a transmitter,
wherein the processor is further configured to use an equation to perform approximation processing on the link loss/gain function, the equation comprising:

$$G(z_i) = \exp(-\alpha z_i) \approx \frac{(N/\alpha)^N}{(z_i + N/\alpha)^N} = \left(\frac{N}{\alpha z_i + N}\right)^N;$$

where, $G(z_i)$ is the link loss/gain function, N is an attenuation control factor, $\alpha$ is an attenuation coefficient of the optical fiber, and $z_i$ is a transmission distance in an i-th section of the optical fiber.

5. A post-compensating apparatus for a nonlinear distortion, comprising:
a digital signal processor,
the digital signal processor is configured to:
divide an optical fiber of a transmission link into multiple optical fiber spans;
for each optical fiber span, use a rational function to perform approximation processing on a link loss/gain function in intra-channel nonlinear distortion estimation;
calculate one or more nonlinear weighting coefficients in the nonlinear distortion estimation by using an approximated link loss/gain function and a dispersion approximation;
perform summation of nonlinear weighting coefficients of respective obtained different optical fiber spans, to obtain an analytical closed solution of the nonlinear weighting coefficient of the transmission link;
use the nonlinear weighting coefficients to calculate vector perturbation items superimposed on a transmitted signal; and
use the vector perturbation items to pre-compensate the transmitted signal,
wherein the processor is further configured to use an equation to perform approximation processing on the link loss/gain function, the equation comprising:

$$G(z_i) = \exp(-\alpha z_i) \approx \frac{(N/\alpha)^N}{(z_i + N/\alpha)^N} = \left(\frac{N}{\alpha z_i + N}\right)^N;$$

where, $G(z_i)$ is the link loss/gain function, N is an attenuation control factor, $\alpha$ is an attenuation coefficient of the optical fiber, and $z_i$ is a transmission distance in an i-th section of the optical fiber.

* * * * *